United States Patent
Hassell, Jr.

(10) Patent No.: US 9,188,472 B2
(45) Date of Patent: Nov. 17, 2015

(54) ENHANCED REFERENCE LINE TANK CALIBRATION METHOD AND APPARATUS

(71) Applicant: Saudi Arabian Oil Company, Dhahran (SA)

(72) Inventor: James C. Hassell, Jr., Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 297 days.

(21) Appl. No.: 13/899,281

(22) Filed: May 21, 2013

(65) Prior Publication Data

US 2014/0345375 A1    Nov. 27, 2014

(51) Int. Cl.

| | |
|---|---|
| *G01F 17/00* | (2006.01) |
| *G01F 23/72* | (2006.01) |
| *G01C 3/08* | (2006.01) |
| *G01F 25/00* | (2006.01) |

(52) U.S. Cl.
CPC .............. *G01F 17/00* (2013.01); *G01C 3/08* (2013.01); *G01F 23/72* (2013.01); *G01F 25/0084* (2013.01)

(58) Field of Classification Search
None
See application file for complete search history.

(56) References Cited

U.S. PATENT DOCUMENTS

| | | | |
|---|---|---|---|
| 3,835,324 A | 9/1974 | Weigle | |
| 3,999,423 A | 12/1976 | Tyree | |
| RE30,013 E * | 5/1979 | Knight | 273/369 |
| 4,502,224 A | 3/1985 | Davies et al. | |
| 5,228,339 A * | 7/1993 | Maresca et al. | 73/290 V |
| 5,473,953 A | 12/1995 | Appel | |
| 5,544,518 A | 8/1996 | Hart et al. | |
| 5,665,895 A | 9/1997 | Hart et al. | |
| 5,809,099 A | 9/1998 | Kim et al. | |
| 5,819,863 A | 10/1998 | Zollinger et al. | |
| 7,296,488 B2 | 11/2007 | Hock et al. | |
| 8,126,596 B1 | 2/2012 | Lee, Jr. et al. | |
| 8,214,081 B2 | 7/2012 | Choi et al. | |
| 2003/0198374 A1 | 10/2003 | Hagene et al. | |
| 2005/0103222 A1* | 5/2005 | Franke et al. | 104/281 |
| 2006/0288756 A1 | 12/2006 | De Meurechy | |
| 2010/0212397 A1* | 8/2010 | Kaya | 73/1.73 |
| 2010/0288042 A1* | 11/2010 | Rose | 73/309 |
| 2012/0288049 A1 | 11/2012 | Renshaw et al. | |

FOREIGN PATENT DOCUMENTS

| | | |
|---|---|---|
| DE | 202004013240 U1 | 12/2004 |
| JP | 63030756 A | 2/1988 |

OTHER PUBLICATIONS

PCT International Search Report and the Written Opinion; dated Jan. 22, 2015; International Application No. PCT/US2014/038572; International File Date: May 19, 2014.

\* cited by examiner

*Primary Examiner* — Andre Allen
(74) *Attorney, Agent, or Firm* — Bracewell & Giuliani LLP; Constance Gall Rhebergen

(57) ABSTRACT

A system for measuring the volume of a tank, including an optical device that emits a laser beam adjacent to a surface of the tank, and a magnetic trolley selectively moveable along the surface of the tank and configured to be remotely controlled by an operator. The magnetic trolley has a linear position sensor in communication with the laser beam to determine the position of the magnetic trolley relative to the laser beam as the magnetic trolley moves on the surface of the tank. A data processor communicates with the linear position sensor to calculate the volume of the tank based at least partially on the position data collected by the linear position sensor.

20 Claims, 7 Drawing Sheets

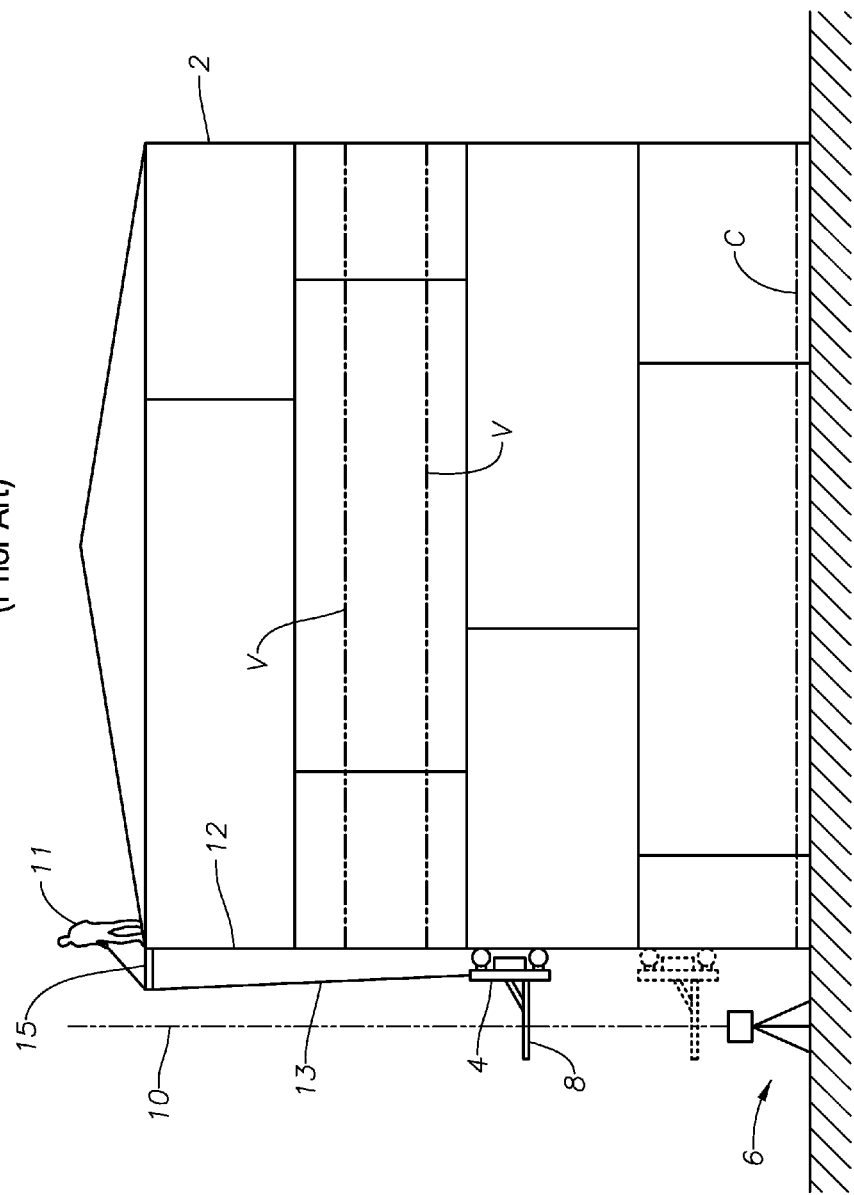

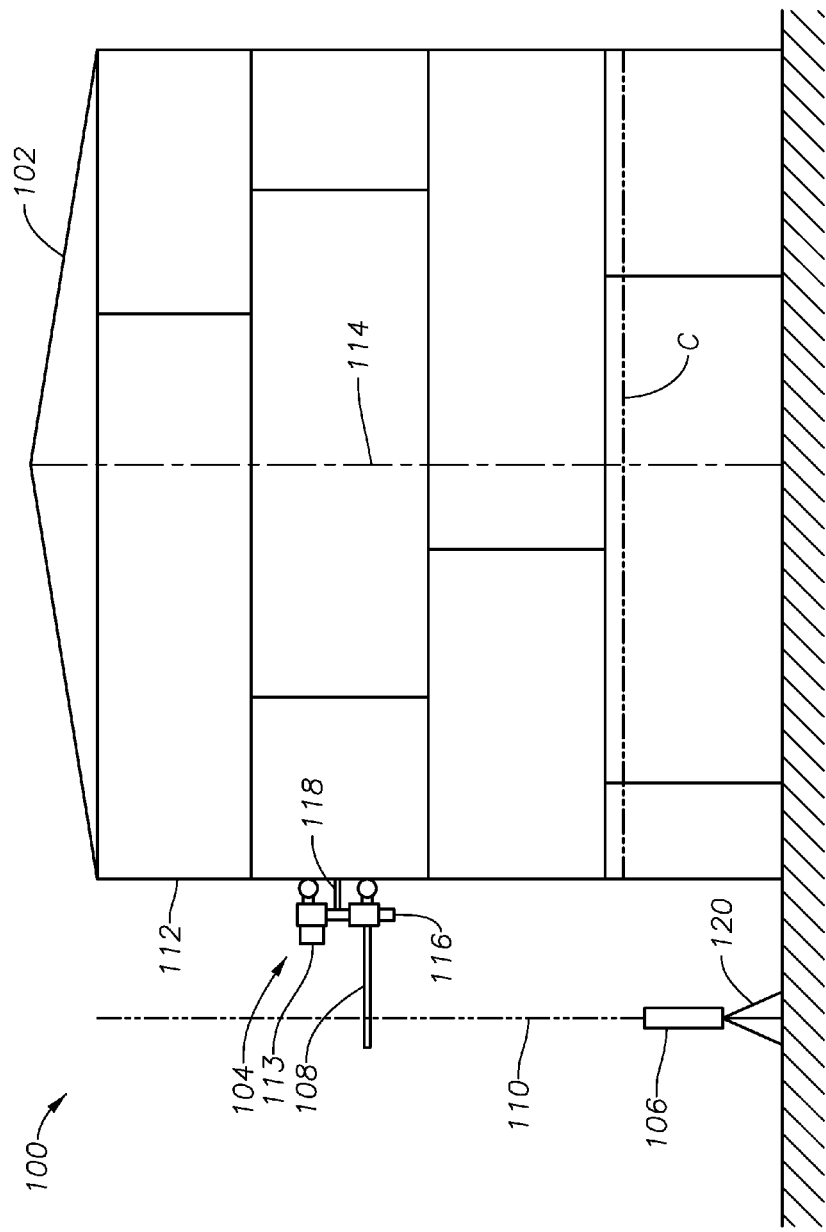

ENHANCED REFERENCE LINE TANK CALIBRATION METHOD AND APPARATUS

BACKGROUND OF THE INVENTION

1. Field of the Invention

The present technology relates to calibration of storage tanks. In particular, the present technology relates to calibration of storage tanks by measuring the horizontal offset of the wall of a tank relative to a vertical laser reference line.

2. Description of the Related Art

Over time, the price of oil and gas products has increased. As a result, the accurate measurement of oil and gas in storage has become increasingly important. Typically, oil and gas can be stored in tanks, many of which are extremely large (e.g., up to about 2,000,000 barrels in volume or more). Accurate knowledge of the volume of such tanks is important so that the owner can maintain accurate information about the amount of oil and gas in the tanks.

There are a number of methods of calibrating, or measuring the volume of these large tanks. For example, one method is to fill the tank, then meter the liquid as the tank is drained to determine the capacity of the tank. This method, however, is very time consuming, and can be very costly because of the size of the tanks. Normally, this method is avoided unless the tank volume cannot be determined geometrically through physical measurement of the tank parameters.

Another method for calibrating tanks is called the optical reference line method (ORLM). The ORLM provides for the calibration of cylindrical tanks by measurement of one reference circumference, followed by determining the remaining circumferences at different elevation levels on the tank. The remaining circumferences are determined by measuring the horizontal offset of the tank wall from a vertical optical reference line. These circumferences are corrected, based on wall thickness, to calculate true internal circumferences, which can then be added to determine the tank volume.

An example of the ORLM method is shown in FIG. 1, in which there is shown a tank 2, a magnetic trolley 4, an optical device 6, and a horizontal graduated scale 8 attached to the trolley 4. The optical device 6 produced an optical ray of light 10 upwardly and parallel to the tank wall 12. The magnetic trolley 4 is typically controlled by an operator 11 positioned on top of the tank 2, that holds a rope 13 attached to the trolley. The operator 11 raises and lowers the trolley 4 on the tank wall 12 by manipulating the rope 13.

To measure the volume of the tank 2, a reference circumference C is first measured. The reference circumference is measured using a master tape (not shown), and is typically measured near the bottom of the tank 2. With the reference circumference known, the trolley 4 can be raised or lowered by the rope 13 to various vertical stations, or predetermined locations, along the tank wall 12. In most systems, the vertical stations are located between the weld seams on the tank. In FIG. 1, two of the vertical stations are indicated by lines V. At each vertical station V, the horizontal offset between the tank wall 12 and the optical ray of light 10 is noted, using the horizontal graduated scale 8. Once a series of measurements have been taken at the vertical stations V, the measurements are repeated with the optical device 6 rotated 180 degrees to verify accuracy. Thereafter the measurements are used to determine the circumference of the tank at each vertical station (using the reference circumference as a reference point), and the volume of the tank can be estimated. Additional factors can also be considered when calculating volume, such as, for example, the temperature of the tank wall 12. This temperature is typically derived based on the temperature inside the tank and the ambient temperature.

While the ORLM method shown in FIG. 1 is better in some ways than filling the tank and metering the fluid, as discussed above, it still has significant problems. For example, measuring the horizontal offset of the trolley 4 from the optical ray 10 at only a few select vertical stations V provides relatively few data points from which tank circumferences can be measured. Although this data can be extrapolated to estimate the volume of the tank, such extrapolations may not always be accurate. In addition, the method of FIG. 1 requires the operator 11 to be positioned on the top of the tank, which can be dangerous. Furthermore, the use of an optical ray 10 and a horizontal graduated scale 8 to measure the horizontal offset of the tank wall 12 lacks the precision necessary to calculate accurate tank volumes. This is because an operator must read the horizontal graduated scale 8 at each horizontal offset, often from a distance.

Another problem with known ORLM methods occurs when the storage tank has a protrusion 15 extending radially outward from the tank wall, which frequently occurs, and which is shown in FIG. 2. In such an instance, the ability of the operator 11 to raise the trolley 4 to the top of the tank 2 is restricted because the rope 13 has to be routed over the protrusion. When this happens, horizontal offset measurements cannot be made at the top of the tank, and in some instances the inaccuracies introduced into the volume calculations by the missing measurements can be great enough to render the ORLM calibration method unreliable.

What is needed therefore, is a tank calibration system that overcomes the disadvantages of known systems.

SUMMARY OF THE INVENTION

One embodiment of the present technology provides a system for measuring the volume of a tank. The system includes an optical device that emits a laser vertical reference line substantially parallel to a surface of the tank, and a magnetic trolley selectively moveable along the surface of the tank and configured to be remotely controlled by an operator. The magnetic trolley includes a linear position sensor in communication with the laser vertical reference line to determine the position of the magnetic trolley relative to the laser vertical reference line as the magnetic trolley moves along the surface of the tank. The system further includes a data processor that communicates with the linear position sensor to calculate the volume of at least a portion of the tank based at least partially on the position data collected by the linear position sensor.

In the system, the surface of the tank can be the internal or external tank wall, and the optical device can emit a laser vertical reference line substantially parallel to the tank wall. The system can further include an infrared temperature sensor attached to the magnetic trolley and positioned proximate the tank wall to measure the temperature of the tank wall, wherein the data processor communicates with the infrared sensor and bases its calculations at least partially on temperature data collected by the infrared temperature sensor. The magnetic trolley can also have an elevation sensor for measuring the elevation of the magnetic trolley relative to the bottom of the tank. The elevation sensor can be pivotable so that it can measure the elevation of the magnetic trolley regardless of the orientation of the trolley on the tank wall.

Alternately, the surface of the tank can be a tank bottom, and the optical device can emit a substantially horizontal laser reference line substantially parallel to the tank bottom. The optical device can be mounted on a tripod to increase stability, and can level on three axes to increase accuracy. In addition, the optical device can be a narrow beam laser diode, and the linear position sensor can be a super linear position sensor, or position sensitive diode.

Another embodiment of the invention provides a system for measuring the volume of a tank that includes a magnetic trolley selectively moveable along a tank wall, the magnetic trolley having a transmitter for transmitting a signal, and an elevation sensor for determining the elevation of the magnetic trolley on the tank wall. The system also includes an access point positioned in the line of sight of the transmitter, the access point having a global positioning receiver for identifying the location of the access point, and configured to receive the signal transmitted by the transmitter, and a data processor that communicates with the access point and the elevation sensor to receive data that can be used to determine the position of the magnetic trolley on the tank wall, and that determines the position of the magnetic trolley on the tank wall at multiple places to calculate the shape and volume of the tank.

In this system, further included can be a plurality of access points that can be distributed at least partially around a perimeter of the tank, and the magnetic trolley can be positioned on the tank wall exterior to the tank. In some cases, the number of access points can be three, and the position of the magnetic trolley on the tank wall can be determined by the data processor using triangulation.

Alternately, the access point can be positioned inside the tank at the center of the tank, and the magnetic trolley can be positioned on the tank wall interior to the tank. The position of the magnetic trolley on the tank wall can be determined by the data processor calculating the radius of the tank based on the distance between the access point and the transmitter, and the elevation of the magnetic trolley. In the embodiments, the magnetic trolley can be remote controlled.

Yet another embodiment of the present technology provides a method for measuring the volume of a tank. The method includes the steps of urging a trolley along a surface of the tank, the trolley having a linear position sensor attached thereto, and illuminating the linear position sensor with a laser beam. The method can also include the steps of monitoring changes of position over time of where the beam illuminates the trolley, and estimating a contour of the surface of the tank based on the step of monitoring.

In some cases, the surface of the tank is the tank wall and the laser beam is positioned vertically proximate the tank wall. In such cases, the method further include measuring the temperature of the wall of the tank using an infrared temperature sensor attached to the trolley and positioned proximate the surface of the tank, and analyzing the temperature data measured by the infrared temperature sensor to help calculate a volume of the tank. Alternately, the surface of the tank can be the tank bottom and the laser beam can be positioned horizontally proximate the tank bottom.

BRIEF DESCRIPTION OF THE DRAWINGS

The present technology will be better understood on reading the following detailed description of nonlimiting embodiments thereof, and on examining the accompanying drawings, in which:

FIG. 2 is a schematic side view of the system of FIG. 1, including a protrusion at the top of the tank that restricts the ability of an operator to raise the trolley to the top of the tank;

FIG. 3 is a schematic side view of a tank calibration system according to an embodiment of the present technology;

DETAILED DESCRIPTION OF THE EXEMPLARY EMBODIMENTS

Figure 1:
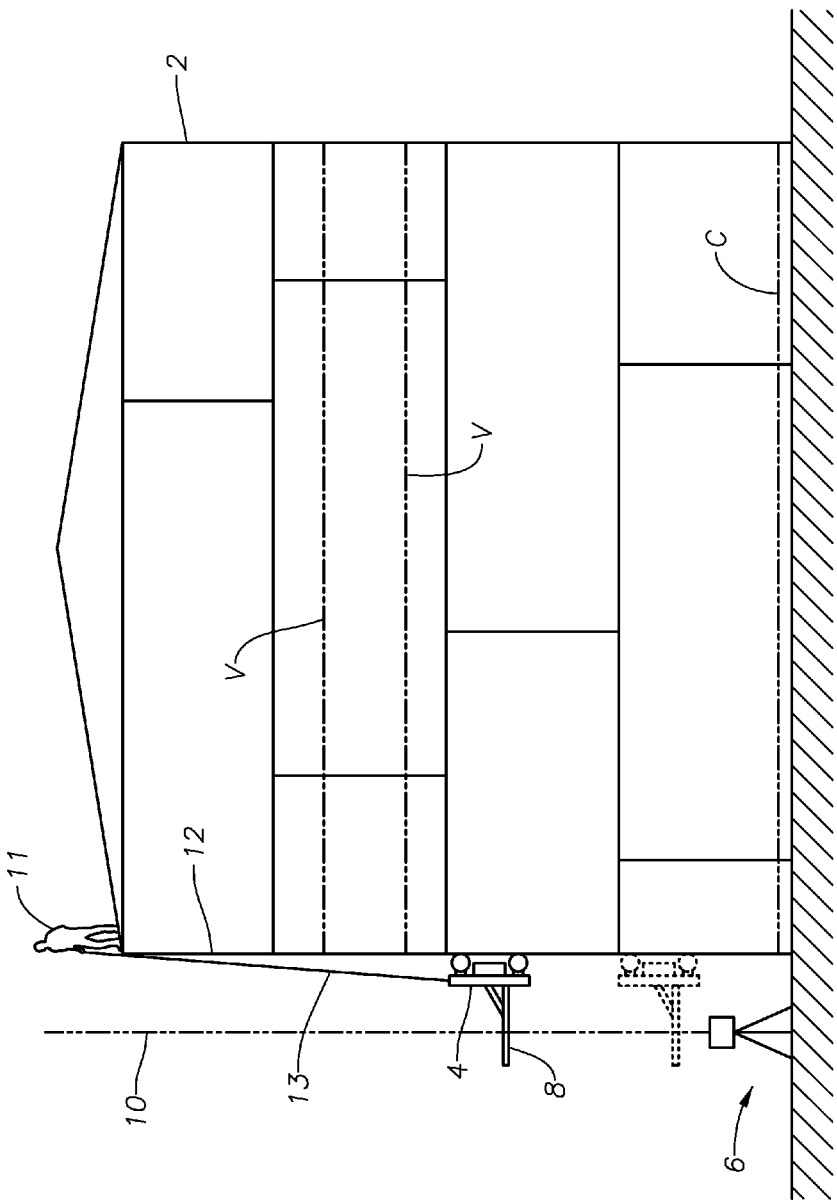
FIG. 1 is a schematic side view of a known system for carrying out the optical reference line method of tank calibration.

The foregoing aspects, features, and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. However, the embodiments are not intended to be limited to the specific terms used, and it is to be understood that each specific term includes equivalents that operate in a similar manner to accomplish a similar purpose.

FIG. 3 is a schematic representation of a system 100 for measuring the volume of a tank that includes a tank 102, a trolley 104, a laser diode 106, and a linear position sensor 108. To measure the volume of the tank 102, the circumference of the tank 102 is first measured at a predetermined reference location using any appropriate method, including the known methods described above, or using the trolley 104 of the present technology, as described in detail below. For example, in FIG. 3, the reference circumference is determined by measuring the horizontal distance around the circumference of the tank 102 along line C. Using the circumference measurement at the reference location, the ring radius of the tank at the reference location can be determined using the series of equations specified in API MPMS Chapter 2.2A Appendix B to correct for the necessary adjustments to the simple geometric relationship of $r=c/2\pi$, where r is the radius, and c is the circumference of the tank.

The laser diode 106 emits a laser vertical reference line 110 upwardly, and is oriented so that the laser vertical reference line 110 is substantially parallel to the wall 112 of the tank 102, by means of a tripod 120 or equivalent supporting device with leveling features along three different axes. The distance from the tank wall 112 to the laser vertical reference line 110 is measured at the reference location. Because the ring radius of the tank at the reference location is known, and the distance from the tank wall 112 to the laser vertical reference line 110 is known, the distance from the center 114 of the tank 102 to the laser vertical reference line 110 can be calculated. Deducting the tank wall thickness determined either directly or from engineering drawings, the internal tank ring radius can be determined.

With the reference circumference C known at the reference location, the trolley 104 can be oriented to move vertically up and down the tank 102, as shown in FIG. 3. The linear position sensor 108 is attached to the trolley 104, and extends outwardly away from the tank wall 112 at least far enough to intersect the laser vertical reference line 110. The linear position sensor 108 can include a readable scale (not shown), photodetector array for position sensing, or other device that indicates the horizontal distance between the tank wall 112 and the laser vertical reference line 110. The readable scale or linear position sensor can be manually or electronically configured to include the trolley and mounting distance or mathematically adjusted in a data processing device 113 to provide an accurate representation offset distance from the vertical reference line 110 and the tank wall 112. As the trolley 104 moves vertically up and down the tank wall 112, the curvature of the tank wall 112 toward or away from the laser vertical reference line 110 can be measured. Thus, the distance between the laser vertical reference line 110 and the tank wall 112 can be measured at any given elevation.

In some embodiments, the linear position sensor 108 can be configured to communicate with a data processing device 113 that can be mounted, for example, remotely or on the trolley, and that continuously receives the measurements, and uses the measurements to determine the contour of the tank wall 112 relative to the laser vertical reference line 110. Such direct communication between the linear position sensor 108 and the data processing device 113 is advantageous because it greatly increases the number of measurement points used for determining the contour of the tank wall and also removes or reduces error that can be associated with human readings of an analog position indicator, such as those typically used in known systems. In addition, the linear position sensor can be configured to repeat the measurements automatically, thereby providing redundancy to ensure that readings are accurate. After the first vertical station is completed the above process is repeated at the required number of locations around the tank.

Because the distance from the laser vertical reference line 110 to the center 114 of the tank 102 is known, as described above, the radius of the tank at any given elevation can be determined. This in turn means that the circumference of the tank at any given elevation can be determined using the formula $c=2\pi r$, where c is the circumference, and r is the radius. Finally, the volume of the tank can be measured using the circumference calculations at any number of desired elevations along the height of the tank wall 112, or optimally integrated into a continual profile of the tank wall at each vertical location. Each of these calculations can be carried out by the data processing device 113. This allows measurement and analysis of up to thousands of data points along the tank wall 112, rather than the few measured in known systems. This increase in measurement sensitivity, and the number of data points collected during the measurement process, leads to more accurate volume calculations during tank calibration. In addition, the system 100 of the present technology reduces the time required to calculate the volume of a tank 102 because the data is collected and analyzed electronically in real-time.

Figure 3A:
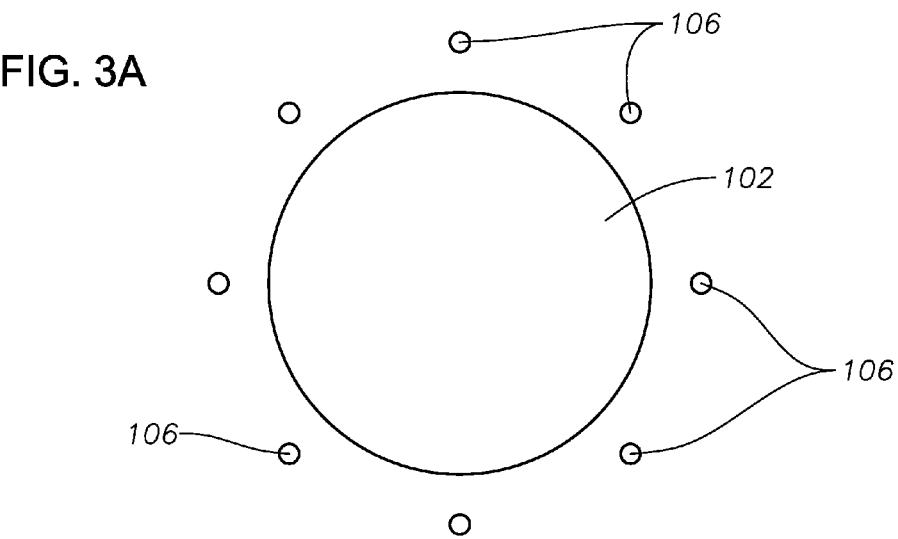
FIG. 3A is a schematic top view of a tank according to an embodiment of the present technology, with laser diodes positioned at multiple locations around the circumference of the tank.

As shown in FIG. 3A, laser diodes 106 can be positioned at multiple locations around the circumference of the tank 102. In such an embodiment, the radius calculations described above can be carried out along multiple vertical reference lines around the tank. Such an arrangement further increases the number of data points, leading to still more accurate volume calculations during tank calibration.

The equipment used in the tank volume measurement system 100 of FIG. 3 includes certain novel features that provide advantages over known tank volume measurement equipment. For example, the trolley 104 can be magnetic, motorized, and remote controlled. The magnetism of the trolley 104 allows it to remain engaged with the tank wall 112, which can be made of steel or other ferrous material, throughout the process of measuring the contour of the tank wall 112. This ability to remain engaged with the tank wall 112 throughout the measuring process is advantageous because it ensures that the horizontal distance measurements between the trolley 104 and the laser vertical reference line 110 are accurate.

The motorization of the trolley 104, and the ability to control the trolley 104 remotely, allows an operator to control the trolley from a location other than on top of the tank with a rope, as is typically done in known systems. For example, the operator could be positioned on and control the trolley from the ground, thereby eliminating the need to climb to the top of the tank to manually control the trolley, an undertaking that can be time consuming and dangerous. In addition, the use of a remote controlled trolley allows the disclosed method of measuring volume to be used on tanks that would normally be excluded from the ORLM method, such as tanks having wind girders or structures at the top of the tank interfering with manual operation. In other words, with the remotely operated trolley 104, the trolley 104 can be driven to points on the tank 102 that would be otherwise inaccessible. The remote control can be radio based, or, alternately, could be provided through an attached wire. In some embodiments, the trolley 104 can be motorized with an electric motor. The trolley can also have wheels, or, alternatively, tracks or other means of moving.

The trolley can also be equipped with additional tools to help improve the accuracy of the volume measurement. For example, the trolley can have an elevation sensor 116 configured to measure the vertical distance $D_V$ of the 104 from the bottom of the tank 102. Such an elevation sensor can help to identify the precise vertical location of the trolley on the tank wall 112 when measurements are desired at pre-determined elevations. The elevation sensor 116 can assist in continual contour offset mapping of the tank wall 112, and can also help to detect the elevation of ring weld markings on the tank 102. In some embodiments, the elevation sensor 116 can be a laser sensor that determines the elevation of the trolley using laser distancing techniques. In addition, the elevation sensor 116 can be pivotally attached to the tank so it can be used during measurement of the reference circumference, as described more fully below.

In addition, the trolley 104 can be equipped with an infrared temperature sensor 118 positioned adjacent the tank wall 112, and configured to measure the temperature of the tank wall 112. Such a temperature measurement is useful because steel expands and contracts with temperature, and this expansion and contraction affects the circumference of the tank at a given elevation. The temperature sensor 118 can be mounted to the underside of the trolley in close proximity to the tank wall 112. The temperature sensor 118 can measure the temperature of the tank wall 112 during measurement of the tank circumference to provide a temperature correction factor for use in calculating the tank volume.

Such a measurement of actual temperature of the tank wall 112 is superior to the known practice of using average internal and ambient temperatures to determine a temperature correction factor based on existing American Petroleum Institute (API) equations. The API equations are not satisfactory because they use the ambient temperature and the estimated internal tank temperature for use in the expansion correction.

The problem with this is that liquids within the tank stratify according to temperature, and the temperature of liquid at the top of the tank can differ from the temperature at the bottom by as much as much as eight (8) degrees Fahrenheit or more. In addition, the tank walls are warmer on the side of the tank exposed to the sun than the side in the shade. Thus, the internal tank temperatures vary widely. Furthermore, ambient temperature measurements can often be arbitrary, and are taken by metrological stations that can be located a great distance from the tank. The trolley-mounted temperature sensor eliminates these problems by measuring the temperature of the tank wall 112 directly.

The laser diode 106 can be a narrow beam laser diode. In certain embodiments, the laser diode 106 can be mounted to a tripod to increase stability, and can be leveled on 3 axes to increase accuracy. The laser diode 106 of the present technology is highly accurate, and can replace the optical ray used in many known optical reference line systems.

The linear position sensor 108 of the present technology can replace the horizontal scale of the prior art, and, in some embodiments, can be a super linear position sensor (SLPS), or position sensitive diode (PSD). Use of the linear position sensor 108 is advantageous because it is highly accurate, providing micrometer accuracy to horizontal position measurements. This is an improvement of up to one thousand (1000) times or more compared to the optical measurement equipment of the prior art. In addition, some embodiments include linear position sensors 108 capable of continuous mapping of the tank wall 112 as the trolley 104 travels the vertical course of the tank wall 112. This helps to improve the accuracy of volume measurements by enabling a large number of circumference measurements along substantially the entire vertical height of the tank 102, rather than measurements at only two points on every tank plate, as in known methods.

The system shown in FIG. 3, and in particular the magnetic remote controlled trolley 104 with an elevation sensor 116 and a temperature sensor 118, the laser diode 106, and the linear position sensor 108, provide many advantages over known systems, as discussed above. In addition, the combination of these features serves to drastically improve the accuracy of volume determinations using the disclosed method of tank calibration.

Figure 4:
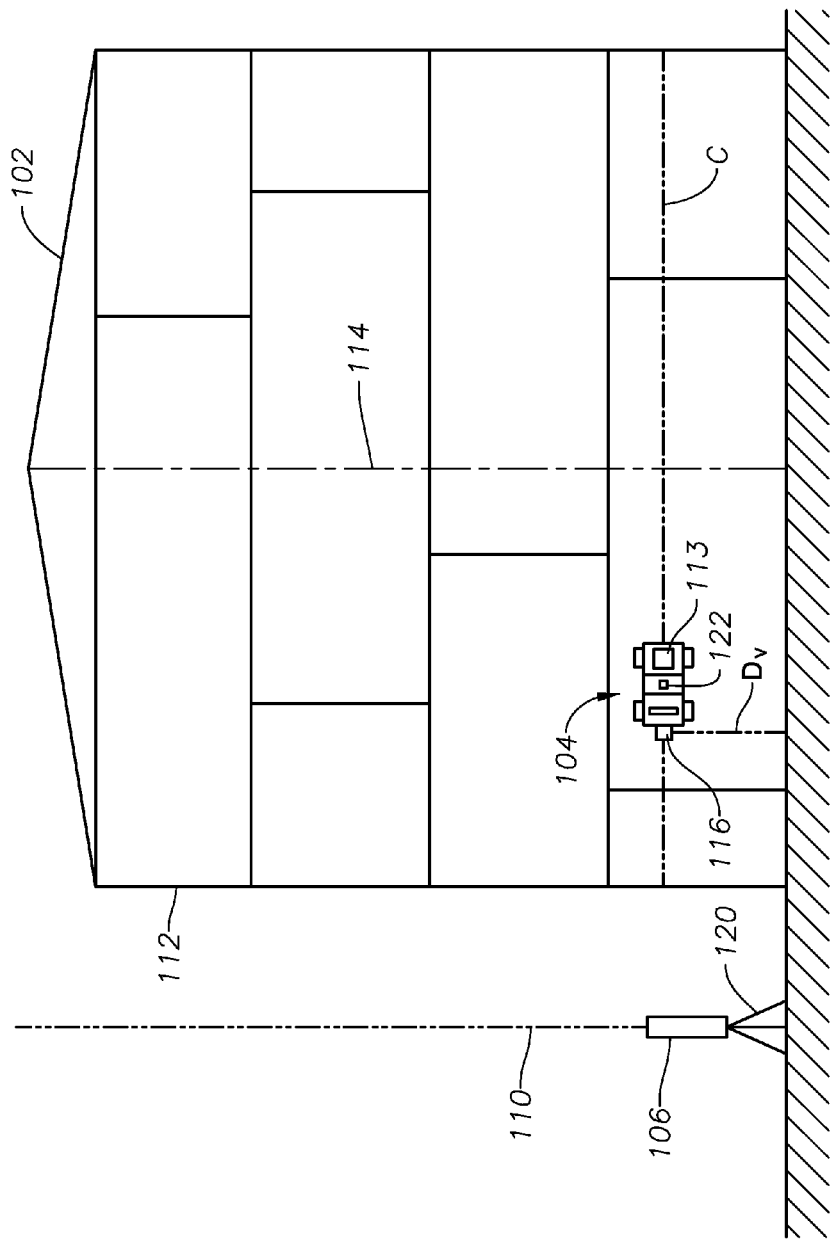
FIG. 4 is a schematic side view of a tank calibration system according to an embodiment of the present technology where the trolley is oriented to measure a reference circumference of the tank.

Referring now to FIG. 4, there is shown the trolley 104 in a horizontal position on the surface of the tank 102. In such a horizontal position, the trolley 104 can measure the circumference C of the tank 102 at a reference location. As discussed above, the accurate measurement of the circumference C of the tank 102 at a reference location helps to ensure that the volume determination of the tank is accurate. To accurately measure the circumference C of the tank 102, the trolley 104 is equipped with a linear tracking device 122. In some embodiments, the linear tracking device 122 can be a calibrated tracking wheel. Alternately, the linear tracking device can be an LED, laser, ultrasonic, or mechanically based device. These devices may also include the use of electromagnetic sensors and digital signal processing (DSP) units usually included with the technology. The linear tracking device based on the selected technology can demonstrate micrometer to millimeter accuracy. The use of the trolley 104 and attached linear tracking device 122 to measure a reference circumference C is advantageous because it removes the requirement for manual tape strapping and can provide an option to replace the manual strapping method of calibration if horizontal traverses are conducted at multiple locations on each shell plate.

The elevation sensor 116 can be pivotally mounted to the trolley 104, so when the trolley is oriented horizontally, as shown in FIG. 4, the elevation sensor can still determine the vertical distance between the trolley 104 and the bottom of the tank 102. Thus, the elevation sensor 116 can be used to ensure that the trolley 116 remains at a uniform vertical elevation around the entire circumference of the tank as it measures the reference circumference C. The trolley can alternately maintain a horizontal course around the circumference of the tank by using an electronic level, such as, for example, an optoelectronic self-leveling sensor.

An alternate embodiment of the present technology provides a system for surveying the bottom of the tank. The shape of the bottom of the tank is often not perfectly planar, and instead has irregular curvature or contour. The irregular contoured nature of the tank bottom affects the volume of the tank, and must be considered to obtain an accurate calibration of the tank.

Figure 5:
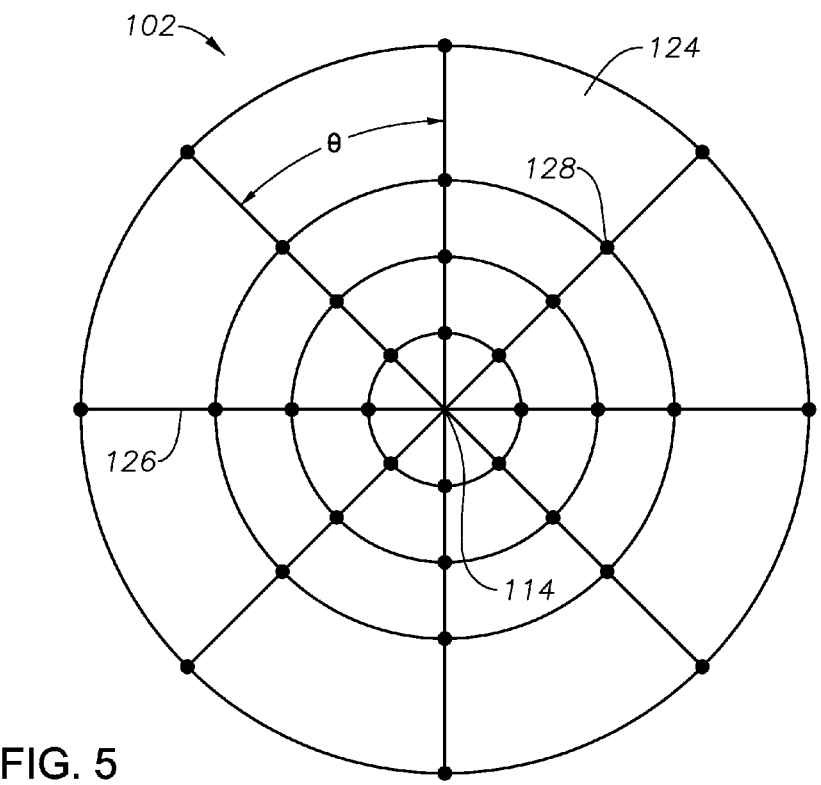
FIG. 5 is a schematic top view of a tank showing the tank bottom and reference lines used to calibrate a the tank bottom.

FIG. 5 shows a top view of the tank 102, including a tank bottom 124, and indicates reference lines 126 and measurement points 128 that may be used to measure the curvature, or contours of the tank bottom 124. The reference lines 126 converge at the center 114 of the tank bottom 124. In known systems, such as that shown in FIG. 6, an optical device 206 is placed at the center 114 of the tank 102, and is positioned to direct an optical ray of light 210 horizontally to the tank wall 112. The optical ray of light 210 is co-linear with a reference line 126. Measurements are taken between the tank bottom 124 and the optical ray of light 210 at predetermined measurement points 128 along the reference line 126. Typically, the measurements are taken using a ruler 232 held by a technician in the tank 102. In this way the distance between the tank bottom 124 and the horizontal optical ray of light 210 is measured at multiple locations along a radius of the tank bottom 124, thereby giving an idea of the curvature of the tank bottom 124 along that radius.

Referring back to FIG. 5, there are shown multiple reference lines 126, each with a plurality of measuring points 128. The above-described process is repeated by redirecting the optical ray of light 210 along each of the reference lines 126, and measuring the distance between the tank bottom 124 and the optical ray of light 210 at each measuring point 128. This process can be repeated until measurements have been taken at all the measurement points 128 shown in FIG. 5, and the series of measurements as a whole can be used to estimate the overall curvature, or contour of the tank bottom 124.

According to accepted standards in the industry, each of the reference lines 126 used in the process should be separated by an angle θ of about 45 degrees. Of course, the smaller the angle θ between reference lines 126, the closer the measuring points 128 will be, and the more accurate the tank bottom curvature can be determined. Similarly, standards in the industry suggest that the measuring points 128 should be located at intervals of no more than about 10 feet between the center 114 of the tank bottom 124 and the tank wall 112. Of course, the smaller the distance between measuring points 128, the more accurate the tank bottom curvature can be determined.

Figure 6:
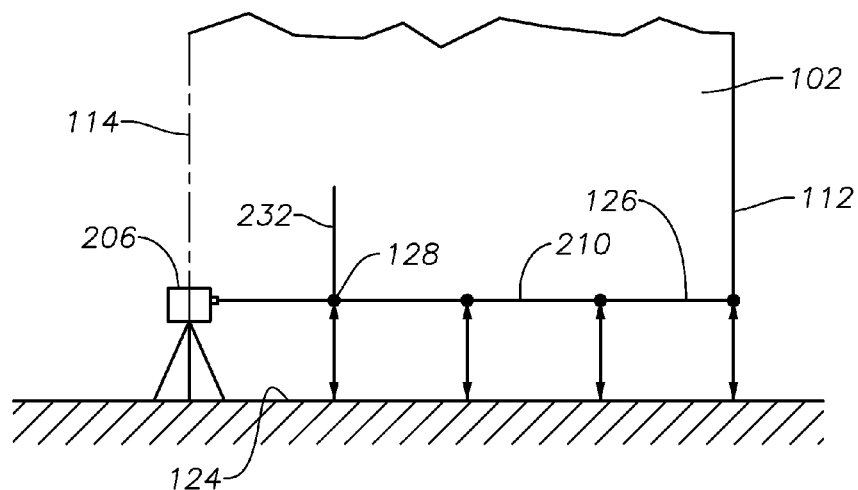
FIG. 6 is a schematic side view of a known system for calibrating a tank bottom.

Although the method shown in FIG. 6 can be useful to determine the approximate curvature of the tank bottom 124, it suffers from many of the same problems as prior art methods of measuring a tank outer diameter, as discussed above. For example, measuring the distance between the tank bottom 124 and the optical ray of light 210 at only a few select measuring points 128 provides relatively few data points from which the tank bottom curvature can be determined. Although this data can be extrapolated to estimate the overall curvature of the tank bottom 124, such extrapolations may not always be accurate. Furthermore, the use of an optical ray of light 210 and a ruler 232 to measure the distance from the tank bottom 124 to the optical ray of light 210 lacks the precision necessary to accurately calculate the tank bottom profile.

Figure 7:
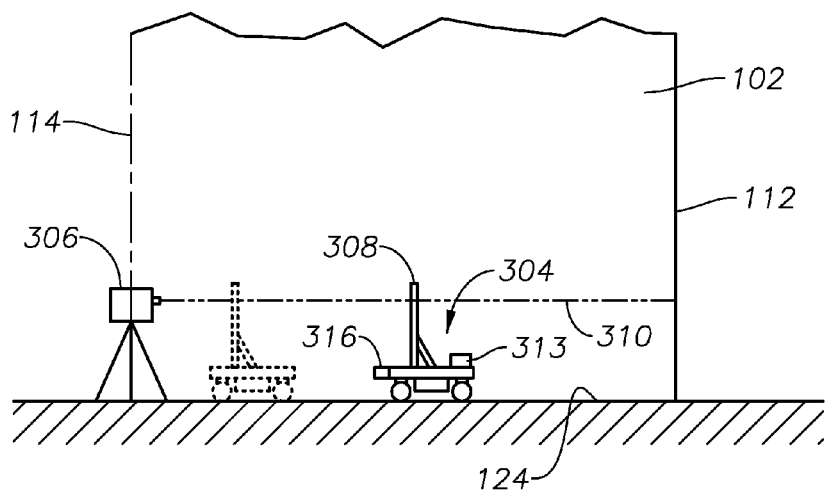
FIG. 7 is a schematic side view of a system for calibrating a tank bottom according to an embodiment of the present technology.

FIG. 7 shows a novel system for measuring the curvature of a tank bottom that overcomes many of the problems discussed above. The system of FIG. 7 includes a laser diode 306 that emits a laser beam 310 from the center 114 of the tank bottom 124 radially outward to the tank wall 112, and is oriented so the laser beam 310 is horizontal. The laser beam 310 is co-linear with a reference line 126 (also shown in FIG. 5). A trolley 304 is positioned on the tank bottom 124, and oriented to travel radially between the laser diode 306 and the tank wall 112. A linear position sensor 308 is attached to the trolley 304, which extends upwardly from the trolley 304 to the laser beam 310, and intersects the laser beam 310. The linear position sensor 308 can include a readable scale (not shown) or other device that indicates the vertical distance between the trolley 304 and the laser beam 310. In addition, the trolley can include an additional position sensor 316 that measures the distance from the trolley to the tank wall 112. Thus, as the trolley 304 moves toward or away from the laser diode 306 along the tank bottom 124, the linear position sensor can continuously measure the curvature of the tank bottom 124. This action can be repeated along any number of reference lines 126 to measure data about the curvature of the entire tank bottom 124.

In some embodiments, the linear position sensor 308 can be configured to communicate with a data processing device 313 that receives measurements from the linear position sensor 308, and uses the measurements to determine the contour of the tank bottom 124. Optionally, the data processing device 313 continuously receives measurements. Such direct communication between the linear position sensor 308 and the data processing device 313 is advantageous because it removes error that can be associated with human readings of a ruler 232 (as shown in FIG. 6). In addition, the linear position sensor 308 can be configured to repeat measurements automatically, thereby providing redundancy to ensure that readings are accurate.

The equipment used to measure the tank bottom 124 includes certain features that provide advantages over known tank bottom measuring equipment. For example, the trolley 304 can be magnetic, motorized, and remote controlled. These features allow for greater autonomy and control of the trolley during the tank bottom measuring process. In addition, the laser diode 306 can be a narrow beam laser diode emitter, which provides a more stable and level reference line. In certain embodiments, the laser diode 306 can be mounted to a tripod 320 to increase stability, and can be leveled on three axes to increase accuracy.

In another embodiment, the linear laser emitting diode station situated at the tank bottom center specified in 306 can be fitted with a beam splitter capable of generating a horizontal reference plane at an elevated position across the entire surface of the tank bottom allowing continuous monitoring vertical measurement with the linear position sensor 308 from any radial line-of-sight position within the tank. Using the motorized trolley, the steering mechanism can be locked to allow continuous concentric or spiral mapping of the tank bottom. The position of the trolley being determined relative to the tank wall using the locking swivel mounted elevation sensor 116 now locked into a 90 degree position perpendicular to the tank wall (see new figure).

The linear position sensor 308 of the present technology can replace the ruler 232 of the prior art, and, in some embodiments, can be a super linear position sensor (SLPS), or position sensitive diode (PSD). Use of the linear position sensor 308 is advantageous because it is highly accurate and precise, providing micrometer accuracy to vertical position measurements. Some embodiments include linear position sensors 308 capable of continuous mapping of the tank bottom 124 as the trolley 304 travels along the tank bottom 124. This helps to improve the accuracy of volume measurements by enabling a large number of measurements to be taken at a large number of measurement points 128 along the entire radius of the tank bottom 124, rather than measurements at only a few discrete points separated by intervals of up to 10 feet, as in known methods.

Figure 8:
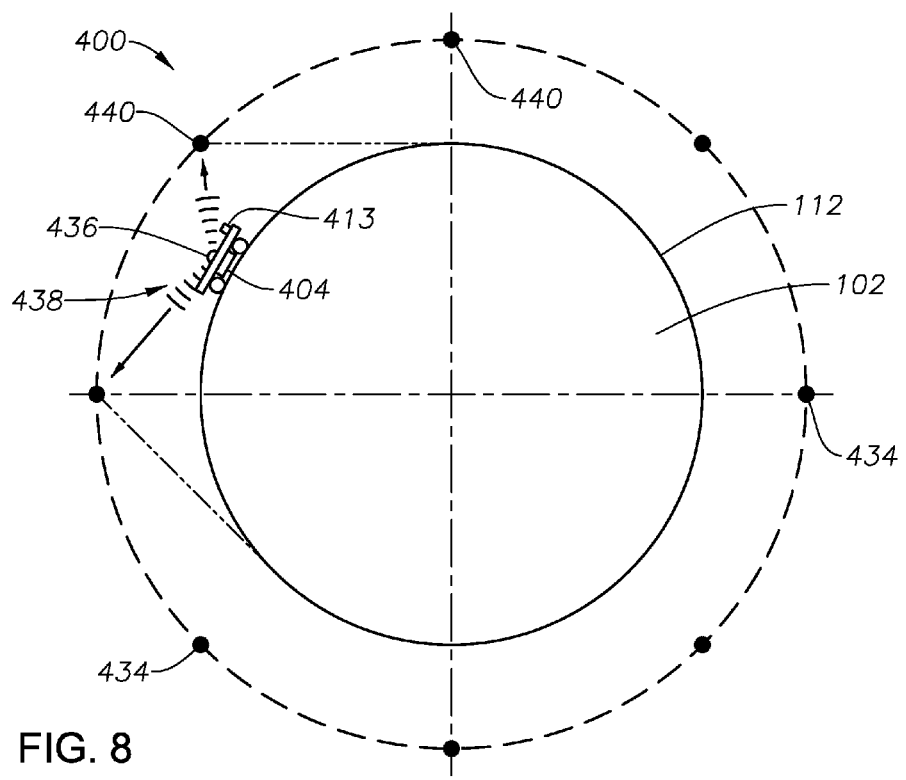
FIG. 8 is a schematic top view of a system for measuring the volume of a tank using triangulation.
Figure 9:
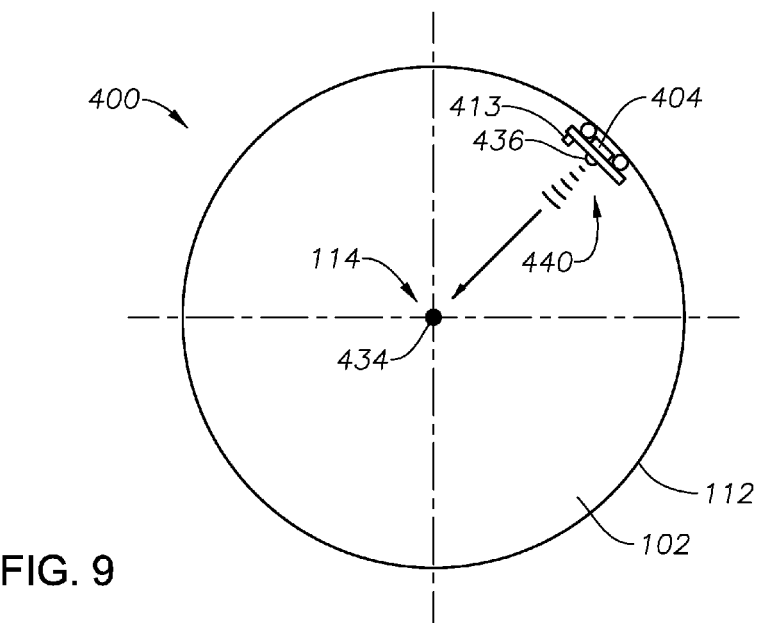
FIG. 9 is a schematic top view of an alternate system for measuring the volume of a tank.

Referring now to FIGS. 8 and 9, there is shown an alternative system 400 for measuring the volume of a tank 102. The volume can be measured externally, as shown in FIG. 8, or internally, as shown in FIG. 9.

The external measurement system of FIG. 8 includes a trolley 404, and access points 434 positioned around the tank 102. The trolley 404 is equipped with a transmitter 436 that emits a communication signal 438 receivable at the access points 434. The transmitter 436 can be electromagnetic (e.g., radio, microwave, etc.) and the signal 438 can be radio waves, electromagnetic waves, etc. The access points 434 can be positioned equidistantly around the perimeter of the tank 102. In an example, the access points 434 are spaced so that at least two access points 434 are within the line of sight of the transmitter 436 at all times while the trolley 404 is on the wall 112 of the tank 102. Each access point 434 is equipped with a global positioning system (GPS) receiver 440 that accurately identifies the location of the access point 434.

In an example of operation, the trolley 404 is positioned on the wall 112 of the tank 102. The transmitter 436, which is attached to the trolley 404, emits a signal 438 to the two or more access points 434 in its line of sight. The access points 434 time-stamp the signal 438, and send the data to a central unit for processing. The central processing unit 413 is capable of calculating, based on the signal 438 and the time stamp, the amount of time that it took the signal 438 to travel from the trolley 404 to the access points 434. Using this information, the process unit 413 calculates the distance of the trolley 404 from each of the access points 438 that receive information from the transmitter 436, and then triangulates the position of the trolley 404 on the wall 112 of the tank 102. This triangulation of trolley position, along with measurements of the height of the trolley 404 above the bottom of the tank 102 (which may be taken using an elevation sensor 116, like the one shown in FIG. 3) are then used to map the three dimensional external shape of the tank 102. With the external shape of the tank 102 known, the volume of the tank can be determined using known methods and equations.

The internal measurement system is shown in FIG. 9. In this embodiment the tank 404 is positioned on the inside of the tank wall 112, and a single access point 434 is positioned at the center 114 of the tank 102. The trolley 404 is equipped with a transmitter 436 that emits a signal 438. Similar to the embodiment of FIG. 8, the transmitter 436, which is attached to the trolley 404, emits a signal 438 to the access point 434 in the center 114 of the tank 102. The access point 434 time-stamps the signal, and sends the data to a central unit 413 for processing.

The central processing unit 413 is capable of calculating, based on the signal 438 and the time stamp, the amount of time that it took the signal 438 to travel from the trolley 404 to the access point 434. Using this information, the processing unit 413 calculates the distance of the trolley 404 from the access point 438. This information, along with measurements of the height of the trolley 404 above the bottom of the tank 102 (which may be taken using an elevation sensor 116, like the one shown in FIG. 3), can be used to calculate the tank radius. This information is then used to map the three dimensional internal shape of the tank 102. With the internal shape of the tank 102 known, the volume of the tank can be determined using known methods and equations.

The trolley 404 of the embodiments shown in FIGS. 8 and 9 includes certain features that provide advantages over known trolleys. For example, the trolley 404 can be magnetic, motorized, and remote controlled. These features allow for greater autonomy and control of the trolley during the tank bottom measuring process.

The triangulation method of tank calibration, as shown and described herein, provides advantages over known tank calibration methods. For example, since the triangulation method creates a three dimensional map of the shape of the tank walls 112, there is no need for measuring a reference circumference around the tank. The elimination of this step is advantageous because measurement of the reference circumference can be time consuming, and adds a possible source of error into the volume calculations. Thus, elimination of this requirement reduces the time needed to calibrate the tank, and reduces the possibility of error.

Although the technology herein has been described with reference to particular embodiments, it is to be understood that these embodiments are merely illustrative of the principles and applications of the present technology. It is therefore to be understood that numerous modifications can be made to the illustrative embodiments and that other arrangements can be devised without departing from the spirit and scope of the present technology as defined by the appended claims.

That claimed is:

1. A system for measuring the volume of a tank, the system comprising:
    an optical device that emits a laser beam parallel to a surface of the tank;
    a magnetic trolley selectively moveable along the surface of the tank and configured to be remotely controlled by an operator, the magnetic trolley comprising:
        a linear position sensor in communication with the laser beam to determine the position of the magnetic trolley relative to the laser beam as the magnetic trolley moves along the surface of the tank; and
    a data processor that communicates with the linear position sensor to calculate the volume of at least a portion of the tank based at least partially on the position data collected by the linear position sensor.

2. The system of claim 1, wherein the surface of the tank is a tank wall, and the optical device emits a laser beam parallel to the tank wall.

3. The system of claim 2, further comprising an infrared temperature sensor attached to the magnetic trolley and positioned proximate the tank wall to measure the temperature of the tank wall, Wherein the data processor communicates with the infrared sensor and bases its calculations at least partially on temperature data collected by the infrared temperature sensor.

4. The system of claim 2, wherein the magnetic trolley has an elevation sensor for measuring the elevation of the magnetic trolley relative to the bottom of the tank.

5. The system of claim 4, wherein the elevation sensor is pivotable so that the elevation sensor can measure the elevation of the magnetic trolley regardless of the orientation of the trolley on the tank wall.

6. The system of claim 1, wherein the surface of the tank is a tank bottom, and the optical device emits a horizontal laser beam parallel to the tank bottom.

7. The system of claim 1, wherein the optical device is mounted on a tripod to increase stability, and is leveled on three axes to increase accuracy.

8. The system of claim 1, wherein the optical device is a narrow bean laser diode.

9. The system of claim 1, wherein the linear position sensor is a super linear position sensor, or position sensitive diode.

10. A system for measuring the volume of a tank, the system comprising:
    a magnetic trolley selectively moveable along a tank wall, the magnetic trolley having a transmitter for transmitting a signal, and an elevation sensor for determining the elevation of the magnetic trolley on the tank wall;
    an access point positioned in line of sight of the transmitter, the access point having a global positioning receiver for identifying the location of the access point, and configured to receive the signal transmitted by the transmitter; and
    a data processor that communicates with the access point and the elevation sensor to receive data to determine the position of the magnetic trolley on the tank wall, and that determines the position of the magnetic trolley on the tank wall at multiple places to calculate the shape and volume of the tank.

11. The system of claim 10, further comprising additional access points distributed at least partially around a perimeter of the tank, and wherein the magnetic trolley is positioned on the tank wall exterior to the tank.

12. The system of claim 11, wherein the number of access points is three, and wherein the position of the magnetic trolley on the tank wall is determined, by the data processor using triangulation.

13. The system of claim 10, wherein the access point is positioned inside the tank at the center of the tank, and the magnetic trolley is positioned on the tank wall interior to the tank.

14. The system of claim 13, wherein the position of the magnetic trolley on the tank wall is determined by the data processor calculating the radius of the tank based on the distance between the access point and the transmitter, and the elevation of the magnetic trolley.

15. The system of claim 10, wherein the magnetic trolley is remote controlled.

16. A method for measuring the volume of a tank, comprising:
    urging a trolley along a surface of the tank, the trolley having a linear position sensor attached thereto;
    illuminating the linear position sensor with a laser beam;
    monitoring changes of position over time of where the beam illuminates the trolley;
    estimating a contour of the surface of the tank based on the step of monitoring;
    analyzing the contour data to calculate a volume of the tank.

17. The method of claim 16, wherein the surface of the tank is the tank wall and the laser beam is positioned vertically proximate the tank wall.

18. The method of claim 17, further comprising the step of measuring the temperature of the wall of the tank using an infrared temperature sensor attached to the trolley and positioned proximate the surface of the tank.

19. The method of claim 18, further comprising the step of analyzing the temperature data measured by the infrared temperature sensor to help calculate a volume of the tank.

20. The method of claim 16, wherein the surface of the tank is the tank bottom and the laser beam is positioned horizontally proximate the tank bottom.

* * * * *

UNITED STATES PATENT AND TRADEMARK OFFICE
CERTIFICATE OF CORRECTION

| | | |
|---|---|---|
| PATENT NO. | : 9,188,472 B2 | Page 1 of 1 |
| APPLICATION NO. | : 13/899281 | |
| DATED | : November 17, 2015 | |
| INVENTOR(S) | : James C. Hassell, Jr. | |

It is certified that error appears in the above-identified patent and that said Letters Patent is hereby corrected as shown below:

Claims

In Column 11, Line 57, Claim 3, the fourth word appears as "Wherein" and should read --wherein--.

In Column 12, Line 17, Claim 10, the fifth and sixth words appears as "in line" and should read --in the line--.

In Column 12, Line 34, Claim 12, the seventh word appears as "determined," and should read --determined--.

Signed and Sealed this
Eighth Day of March, 2016

Michelle K. Lee
*Director of the United States Patent and Trademark Office*